(12) United States Patent
Cho (10) Patent No.: US 9,331,521 B2
(45) Date of Patent: May 3, 2016

(54) ENERGY STORAGE APPARATUS

(71) Applicant: Power Bridge Co., Ltd., Gunpo (KR)

(72) Inventor: Wonjin Cho, Daejon (KR)

(73) Assignee: POWER BRIDGE CO., LTD., Gunpo (KR)

( * ) Notice: Subject to any disclaimer, the term of this patent is extended or adjusted under 35 U.S.C. 154(b) by 174 days.

(21) Appl. No.: 14/338,323

(22) Filed: Jul. 22, 2014

(65) Prior Publication Data

US 2015/0028795 A1    Jan. 29, 2015

(30) Foreign Application Priority Data

Jul. 23, 2013  (KR) ........................ 10-2013-0086818

(51) Int. Cl.
| *H02J 7/00* | (2006.01) |
| *H01M 10/44* | (2006.01) |
| *H01M 10/46* | (2006.01) |
| *H02J 7/35* | (2006.01) |

(52) U.S. Cl.
CPC ........................ *H02J 7/35* (2013.01)

(58) Field of Classification Search
CPC ......... Y02E 10/40; Y02E 10/50; Y02E 10/52; Y02E 60/12; H02J 7/35; H02J 7/355; H01M 10/465; H01M 16/006
USPC ......................................................... 320/101
See application file for complete search history.

(56) References Cited

U.S. PATENT DOCUMENTS

| 4,649,334 | A | * | 3/1987 | Nakajima | .................. | G05F 1/67 |
| | | | | | | 136/293 |
| 5,569,998 | A | * | 10/1996 | Cowan | ...................... | H02J 7/35 |
| | | | | | | 136/291 |
| 6,051,954 | A | * | 4/2000 | Nagao | ..................... | F21S 9/032 |
| | | | | | | 320/101 |
| 8,786,247 | B2 | * | 7/2014 | Ishino | .................. | H01M 10/44 |
| | | | | | | 307/125 |
| 2001/0023703 | A1 | * | 9/2001 | Kondo | .............. | H01L 31/02021 |
| | | | | | | 136/244 |
| 2004/0095091 | A1 | * | 5/2004 | McNulty | .................. | H02J 1/10 |
| | | | | | | 320/101 |
| 2009/0079385 | A1 | * | 3/2009 | Xiao | ................... | H02M 3/1584 |
| | | | | | | 320/102 |
| 2009/0121549 | A1 | * | 5/2009 | Leonard | ............... | H02M 3/156 |
| | | | | | | 307/51 |
| 2011/0115295 | A1 | * | 5/2011 | Moon | ....................... | H02J 3/32 |
| | | | | | | 307/65 |
| 2013/0342154 | A1 | * | 12/2013 | Yamamoto | ............. | H02J 7/007 |
| | | | | | | 320/101 |

FOREIGN PATENT DOCUMENTS

| JP | 2002-199614 | 7/2002 |
| KR | 10-1018647 B1 | 3/2011 |

* cited by examiner

*Primary Examiner* — Arun Williams
(74) *Attorney, Agent, or Firm* — Patent Office of Dr. Chung Park (57) ABSTRACT

An energy storage apparatus includes an input unit connected to a solar cell to receive a DC power, a sensing unit for sensing and outputting a voltage of the solar cell, a signal generating unit for generating a periodic signal whose magnitude is periodically changed, a voltage generating unit for variously generating a reference voltage corresponding to the periodic signal, a control signal generating unit for generating a duty control signal by using regions in which the periodic signal has a magnitude lower than or higher than the reference voltage, a charging unit for performing a charging operation by means of an on/off switching operation according to the duty control signal, a battery unit for charging an energy by means of the charging operation of the charging unit, and a main control unit configured to control so that the charging operation is initiated with a reference voltage.

7 Claims, 6 Drawing Sheets

ENERGY STORAGE APPARATUS

CROSS-REFERENCE TO PRIOR APPLICATIONS

The present application claims priority to Korean Patent Application No. 10-2013-0086818 filed on Jul. 23, 2013, the disclosures of which are incorporated herein by reference in their entirety.

TECHNICAL FIELD

The present disclosure relates to an energy storage apparatus which charges and uses an electric energy, and more particularly, to an energy storage apparatus capable of optimizing a charging environment in a user-oriented manner according to various kinds of input power sources and, when being charged from a solar cell, also capable of optimizing a charging efficiency by tracing a charging state according to a charging environment and variously applying a magnitude of a charged current.

BACKGROUND ART

When an electric or electronic product is used, a power is generally supplied through a commercial power source. However, if a power supply line is not connected or mobility should be ensured, a battery serving as an energy storage apparatus is charged and an electric product is used with the charged energy. In this case, the battery may be implemented as a lead storage battery, a secondary cell stack or the like.

The energy storage apparatus charges an energy by using an adaptor device which converts a commercial current into DC or through a terminal which supplies a DC power generated from a generator of a vehicle or a motorcycle, and the energy storage apparatus is used as a kind of power source in a place or position where charging is required.

Meanwhile, as attention is focused on environment-friendly energy, there have been proposed many products using a solar cell for generating a power by means of the photoelectric effect representing that charges generated by solar rays transfer by using P- and N-type semiconductors.

However, an existing energy storage apparatus is individualized for each kind of power and thus charged only by a specific power source, and also such an energy storage apparatus is designed to have a behavior characteristic in which charging is performed under only a specific operation condition. Therefore, the energy storage apparatus does not ensure versatile application if different kinds of power sources are used.

Further, in recent days in which outdoor living is propagated, an energy storage apparatus designed to use solar rays as a charging power source in the outside is more necessary. An existing charging device using a solar cell does not effectively reflect characteristics of the solar cell having a differential behavior characteristic according to temperature, environment, light intensity or the like. Moreover, since only a complicated algorithm for enhancing the efficiency of the solar cell is applied as disclosed in the Korean Unexamined Patent Publication No. 2007-0078092, the energy storage apparatus is uneconomical, and users may not easily use the energy storage apparatus.

DISCLOSURE

Technical Problem

One embodiment of the present invention is designed to solve the problems of the related art, and therefore the present disclosure is directed to providing an energy storage apparatus which may have an optimal charging condition regardless of the kind of power source by effectively reflecting an electric characteristic of the power source and a characteristic of a battery included in the energy storage apparatus even though charging is performed using a plurality of power sources.

One embodiment of the present invention is directed to providing an energy storage apparatus which may ensure a high charging efficiency with a simple design by organically reflecting a voltage characteristic of a solar cell and a behavior characteristic of a battery charging current.

Other objects and advantages of the present disclosure will be understood from the following description and become more apparent by embodiments of the present disclosure. In addition, it could be easily understood that the objects and advantages of the present disclosure can be implemented by components defined in the claims or their combinations.

Technical Solution

In one aspect of the present disclosure, there is provided a user-oriented energy storage apparatus embodied with charging optimization, which includes an input unit connected to a solar cell to receive a DC power; a sensing unit configured to sense and output a voltage of the solar cell; a signal generating unit configured to generate a periodic signal whose magnitude is periodically changed; a voltage generating unit configured to variously generate a reference voltage corresponding to the periodic signal; a control signal generating unit configured to generate a duty control signal by using regions in which the periodic signal has a magnitude lower than or higher than the reference voltage; a charging unit configured to perform a charging operation by means of an on/off switching operation according to the duty control signal; a battery unit configured to charge an energy by means of the charging operation of the charging unit; and a main control unit configured to control so that the charging operation is initiated with the reference voltage being 0V, wherein the main control unit controls to generate a reference voltage lower than a present reference voltage when a present solar cell voltage is smaller than a previous solar cell voltage and to generate a reference voltage higher than the present reference voltage when the present solar cell voltage is greater than the previous solar cell voltage.

Here, the main control unit of the present disclosure may calculate a hourly change rate of a solar cell voltage by using the present solar cell voltage, the previous solar cell voltage and a sensing time interval of the solar cell voltage, and variously adjust an increment or decrement of the reference voltage according to the calculated hourly change rate.

In another embodiment of the present disclosure, the input unit of the present disclosure may receive a DC power from an external power source, which is a DC power supply device provided at a vehicle or an adaptor device for supplying a DC power from a commercial power source, and the user-oriented energy storage apparatus may further include an interface unit configured to receive a set charging current from a user through a variable adjustment unit; and a DB unit configured to store data in which charging currents and reference voltages corresponding thereto are associated with each other. In this case, when the set charging current is input from the user, the main control unit may extract a reference voltage corresponding to the input set charging current from the DB unit and control the voltage generating unit to output a constant reference voltage corresponding to the reference voltage so that a battery unit is charged with the set charging current.

In another embodiment of the present disclosure, when a DC power is supplied from the external power source, the sensing unit may sense and output an electric characteristic value of the external power source. In this case, the main control unit may calculate a max charging current, which is a present chargeable maximum current, by using a power output from the sensing unit and a chargeable maximum current of the battery unit, output alarm information when the set charging current input by the user is greater than the calculated max charging current, and control to perform the charging operation only when the charging current input by the user is smaller than the max charging current.

In addition, in another embodiment of the present disclosure, the main control unit of the present disclosure may extract a reference voltage corresponding to the calculated max charging current from the DB unit, and control the voltage generating unit to output a constant reference voltage corresponding to the reference voltage so that the battery unit is charged with the max charging current.

Advantageous Effects

In an embodiment of the present disclosure, an optimal charging environment according to an environment or a characteristic of a solar cell may be implemented since a variable charging current is applied according to an external environment and a behavior characteristic due to a charging of the solar cell.

In another embodiment of the present disclosure, a user may variously adjust a charging environment such as a charging current according to the kind of a charging power, and generate and utilize information about a chargeable maximum current by organically considering an electric characteristic of a power source and a characteristic of a battery included in the energy storage apparatus so that an optimal charging environment may be induced. In this way, it is possible to implement a user-oriented energy storage apparatus.

BEST MODE

Other objects, features and advantages of the present invention will become apparent from the following descriptions of the embodiments with reference to the accompanying drawings, from which it will be deemed that a person having ordinary skill can easily practice the technical spirit of the present invention. Also, any explanation of the prior art known to relate to the present invention may be omitted if it is regarded to render the subject matter of the present invention vague. Hereinafter, exemplary embodiments of the present invention will be described in detail with reference to the accompanying drawings.

Figure 1:
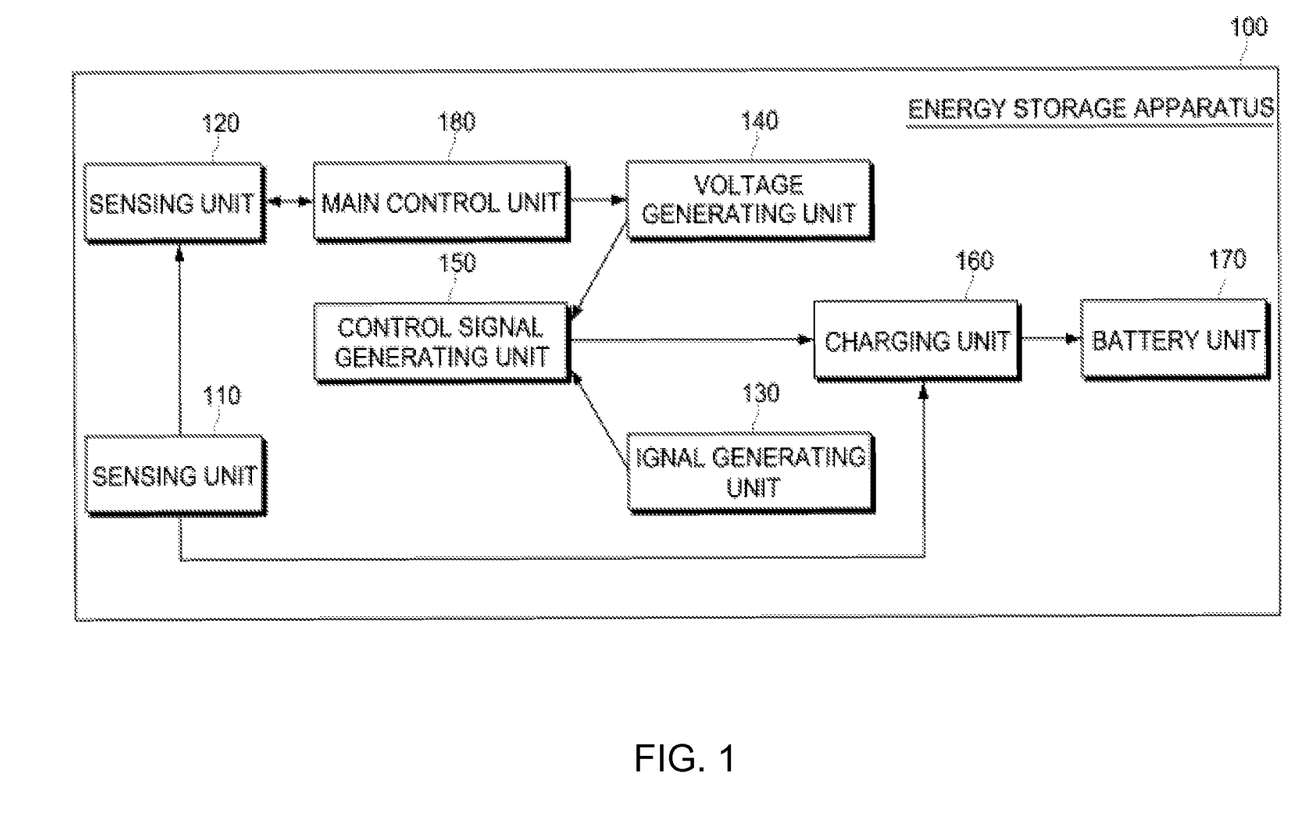
FIG. 1 is a block diagram showing an energy storage apparatus according to an embodiment of the present disclosure.

FIG. 1 is a block diagram showing a user-oriented energy storage apparatus embodied with charging optimization 100 (hereinafter, also referred to as an energy storage apparatus) according to an embodiment of the present disclosure.

As shown in FIG. 1, the energy storage apparatus 100 of the present disclosure may include an input unit 110, a sensing unit 120, a signal generating unit 130, a voltage generating unit 140, a control signal generating unit 150, a charging unit 160, a battery unit 170 and a main control unit 180.

The input unit 110 of the present disclosure has an interface function for supplying a power by means of various kinds of external power sources as described later. The following explanation is based on an example in which the input unit 110 is connected to a solar cell and receives a DC power therefrom. In addition, an embodiment described later with reference to FIG. 6 will be based on an example in which a DC power is supplied from a vehicle, an adaptor or the like.

If a solar cell is connected through the input unit 110, the sensing unit 120 of the present disclosure senses a voltage of the solar cell and outputs the voltage value to the main control unit 180, described later. An $n^{th}$ (present) sensed voltage value and an $n-1^{th}$ (previous) sensed voltage value, generated by the solar cell, will be utilized as parameters for changing a reference voltage and adjusting and controlling a charging current according to the changed reference voltage.

The signal generating unit 130 of the present disclosure generates a periodic wave whose magnitude periodically changes, by using an electronic element, a diode element, an RCL or the like. A sine wave or a standing wave is example of the periodic wave. For clearer comparison with a reference voltage as described later, the periodic wave may employ a triangular wave as shown in (a) of FIG. 2. Hereinafter, the embodiment of the present disclosure will be described based on the triangular wave.

Meanwhile, the voltage generating unit 140 of the present disclosure has a certain constant by means of Vcc and Vref voltages of a hardware chip, electronic elements having an adjustable voltage by a variable resistance or an applied control signal, or their combinations. Here, the voltage generating unit 140 generates a reference voltage having a variable constant as shown in (b) of FIG. 2.

The reference voltage may be implemented as a voltage applied to a CTRL terminal, which is a characteristic terminal of an IC chip, by using various voltages or electronic elements as described above in order to enhance the efficiency in implementation of the element or voltage adjustment and change and ensure a simpler design of the circuit.

Figure 2:
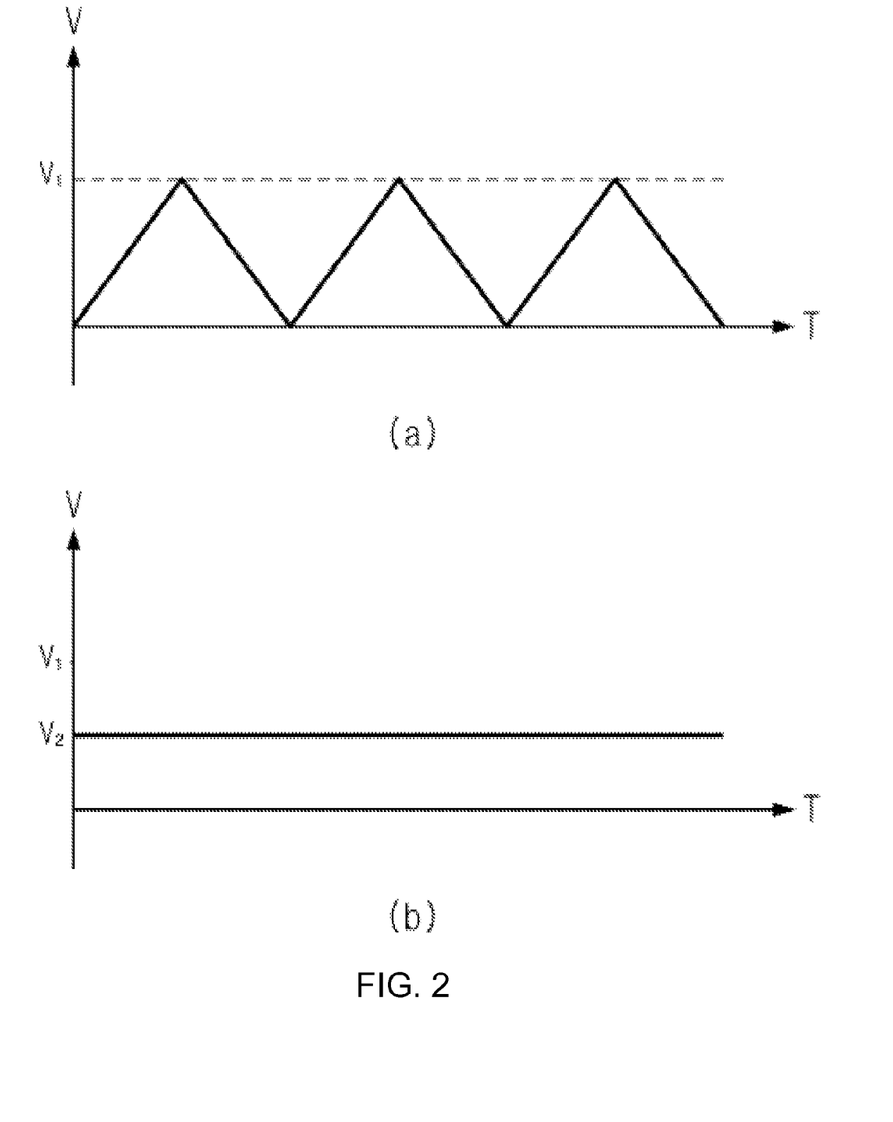
FIG. 2 is a diagram showing a triangular wave signal, which is an example of a periodic signal, and a reference voltage according to an embodiment of the present disclosure.

Hereinafter, a method for generating a duty control signal by the control signal generating unit 150 of the present disclosure will be described with reference to FIGS. 2 and 3. If a triangular wave periodic signal and a reference voltage signal are generated as shown in (a) and (b) of FIG. 2, the control signal generating unit 150 of the present disclosure compares both signals as shown in (a) of FIG. 3 to distinguish regions in which the reference voltage is higher or lower than the triangular wave periodic signal, and generates an on/off signal system for each region as shown in FIG. (b) of FIG. 3 to generate the duty control signal.

Figure 3:
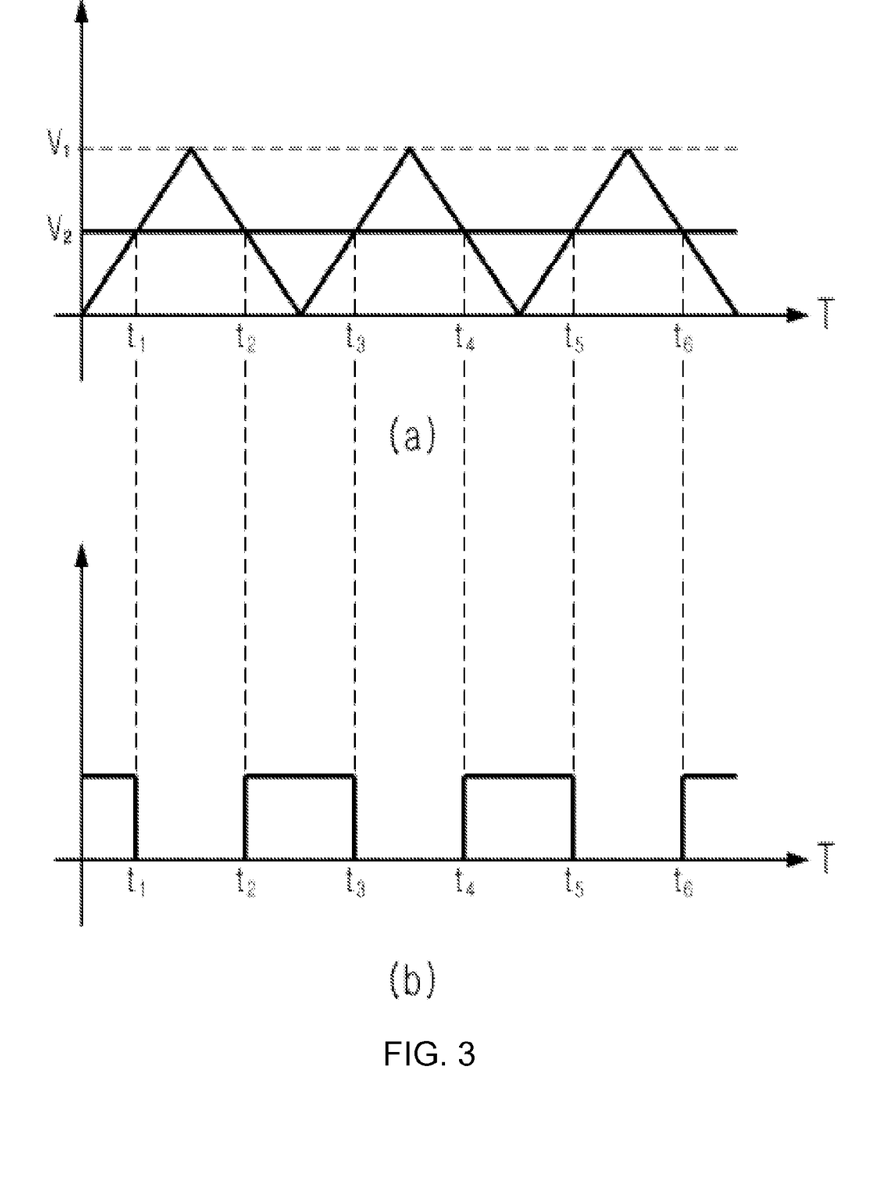
FIG. 3 is a diagram showing a duty control signal generated to control a charging current by using a triangular wave and a reference voltage waveform according to an embodiment of the present disclosure.

As shown in FIG. 3, the control signal generating unit 150 generates a signal "0" in time intervals of t1 to t2, t3 to t4, and t5 to t6 since the reference voltage is lower than the triangular wave periodic signal in these time intervals, and the control signal generating unit 150 generates a signal "1" in time intervals of t2 to t3 and t4 to t5 since the reference voltage is higher than the triangular wave periodic signal in these time intervals.

If the reference voltage signal is generated lower than the example of FIG. 3, regions in which the reference voltage is smaller than the triangular wave periodic signal increase, and regions in which the reference voltage is greater than the triangular wave periodic signal decrease.

On the contrary, if the reference voltage signal is generated greater than the example of FIG. 3, regions in which the reference voltage is smaller than the triangular wave periodic signal decrease, and regions in which the reference voltage is greater than the triangular wave periodic signal increase.

In other words, as the generated reference voltages have differential magnitudes relative to the triangular wave periodic signal, a ratio of the duty control signal finally generated by the control signal generating unit 150 varies. If the reference voltage is lower, the off region of the duty control signal is greater, and if the reference voltage is higher, the off region of the duty control signal is smaller.

However, it is also possible that a signal "0" is generated when the reference voltage relative to the triangular wave periodic signal is higher than the triangular wave periodic signal, and a signal "1" is generated when the reference voltage relative to the triangular wave periodic signal is lower than the triangular wave periodic signal, contrary to the above.

The reference voltage relative to the triangular wave periodic signal is generated by the voltage generating unit 140 of the present disclosure, and the main control unit 180, described later, controls the voltage generating unit 140 to variously adjust a magnitude of a generated reference voltage.

The duty control signal generated as above is input to the charging unit 160 of the present disclosure, and the charging unit 160 charges the battery unit 170 by means of on-off switching operations using a switching unit by the duty control signal.

The charging unit 160 includes a combination of coils and capacity elements therein, and thus when the duty control signal is in an on or off state, the charging unit 160 configures a charging loop differently so that the charging current flows to the battery unit 170. Therefore, if regions in which the duty control signal is "1", namely corresponding to "ON", are greater, more charging current flows to the battery unit.

As a result, if the reference voltage varies as described above, region proportions of the duty control signal change, and the change of the duty control signal causes the charging current finally charged to the battery unit 170 to vary.

Generally, if the charging current flowing to the battery unit 170 is greater, a charging speed may be improved. However, if the charging current is beyond an available range of an external power source at a specific point, the external power source or electronic elements of the energy storage apparatus may be damaged, and the charging operation may not be properly performed.

The main control unit 180 of the present disclosure uses this phenomenon in the charging operation using a solar cell, and in this way, the main control unit 180 continuously monitors a voltage of the solar cell and applies the monitoring result to a variable setting of the reference voltage, thereby preventing any interruption of charging and minimizing any damage to the device.

Figure 4:
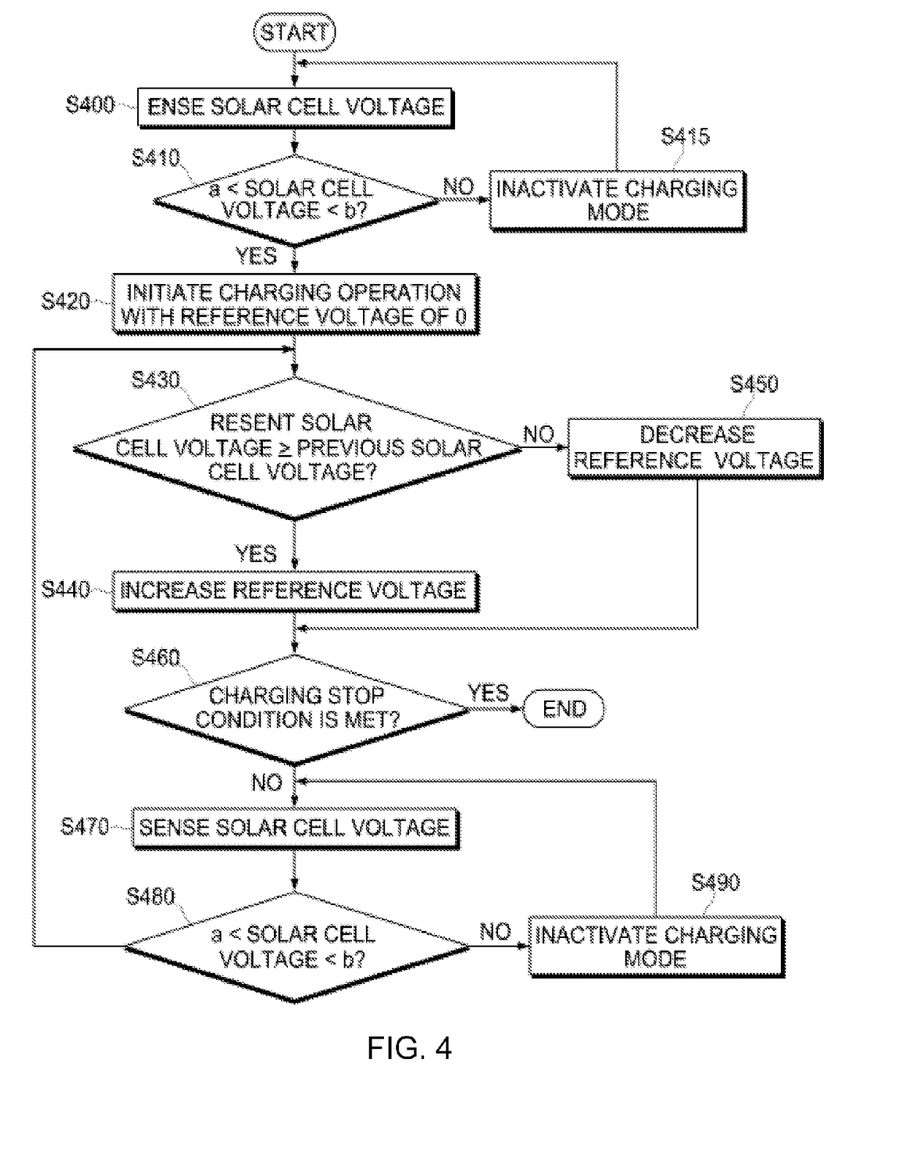
FIG. 4 is a flowchart for illustrating a processing method of the present disclosure in which a charging current is differentially adjusted according to a behavior characteristic of a solar cell.

Hereinafter, a charging operation of the energy storage apparatus 100 according to the present disclosure, which includes the main control unit 180, will be described with reference to FIG. 4.

If the sensing unit 120 of the present disclosure generates a solar cell voltage (S400), the main control unit 180 of the present disclosure determines whether the sensed solar cell voltage is within a chargeable voltage range which may be variously set (S410).

If the voltage is too high or too low, the charging operation may be inactivated to protect an internal element or the like (S415). In addition, the energy storage apparatus 100 may also be charged from another DC power source of the present disclosure, as described later. In this case, the charging operation using a solar cell may be activated only within a specific voltage range in order to ensure versatile application to various kinds of input power sources.

If the solar cell voltage is within the chargeable range, the main control unit 180 controls so that the reference voltage generated by the voltage generating unit 140 becomes 0V and initiates the charging operation (S420). As described above, the reference voltage may be controlled to become 0V when the charging operation is initiated, and in some embodiments, the reference voltage may also be controlled to become about 0.05 to 0.2V in order to rapidly initiate minimal operations.

Next, Step 430 is performed. However, if the present solar cell voltage is sensed to be 9V, the solar cell voltage is regarded as 0V since there is no previous solar cell voltage, which corresponds to a case where the present solar cell voltage is equal to or greater than the previous solar cell voltage. In this case, the main control unit 180 controls to increase the reference voltage.

If a stop condition such as power interruption, fuse breakage or the like is not met (S460), the solar cell voltage is sensed again and the sensed value is input to the main control unit 180 (S470). Similar to Step 410, if the solar cell voltage is not within a chargeable voltage range, the charging mode may be inactivated (S490).

If a solar cell voltage ($n^{th}$) of a present point is input, the solar cell voltage ($n^{th}$) is compared with a solar cell voltage ($n-1^{th}$) of a previous point, and the reference voltage is increased or decreased according to the comparison result. This process repeats until the stop condition is met.

If the solar cell voltage ($n^{th}$) of the present point is greater than the solar cell voltage ($n-1^{th}$) of the previous point, the main control unit 180 of the present disclosure controls the voltage generating unit 140 to increase the reference voltage. Even though the reference voltage increases as above and thus the charging current becomes higher, as long as the solar cell is still capable of outputting a voltage over a suitable level, this means that the charging environment has no problem. Therefore, the reference voltage is gradually increased to raise the charging current, thereby improving the charging efficiency.

If the solar cell voltage ($n^{th}$) of the present point is smaller than the solar cell voltage ($n-1^{th}$) of the previous point, the main control unit 180 of the present disclosure controls the voltage generating unit 140 to decrease the reference voltage.

In a state where the reference voltage gradually increases to a specific point, the on region of the duty control signal gradually increases accordingly, and the charging current is gradually increases, if the solar cell does not provide a specific charging current, the voltage of the solar cell lowers.

The solar cell has a behavior characteristic in which a generated power ceaselessly varies depending on weather, environment, temperature, radiation angle or the like. As mentioned above, if the magnitude of the charging current is maintained even though the solar cell is not capable of coping with the present charging current due to an external environment, the charging operation is not performed, or cells in the solar cell are damaged, which may further cause damage in the energy storage apparatus.

Therefore, when charging the battery unit 170, if the solar cell generates a high power, it is desirable to perform the charging operation with a high charging current, and if the solar cell generates a low power, it is desirable to perform the charging operation ceaselessly by using a low charging current even though a charging time increases more or less.

Figure 5:
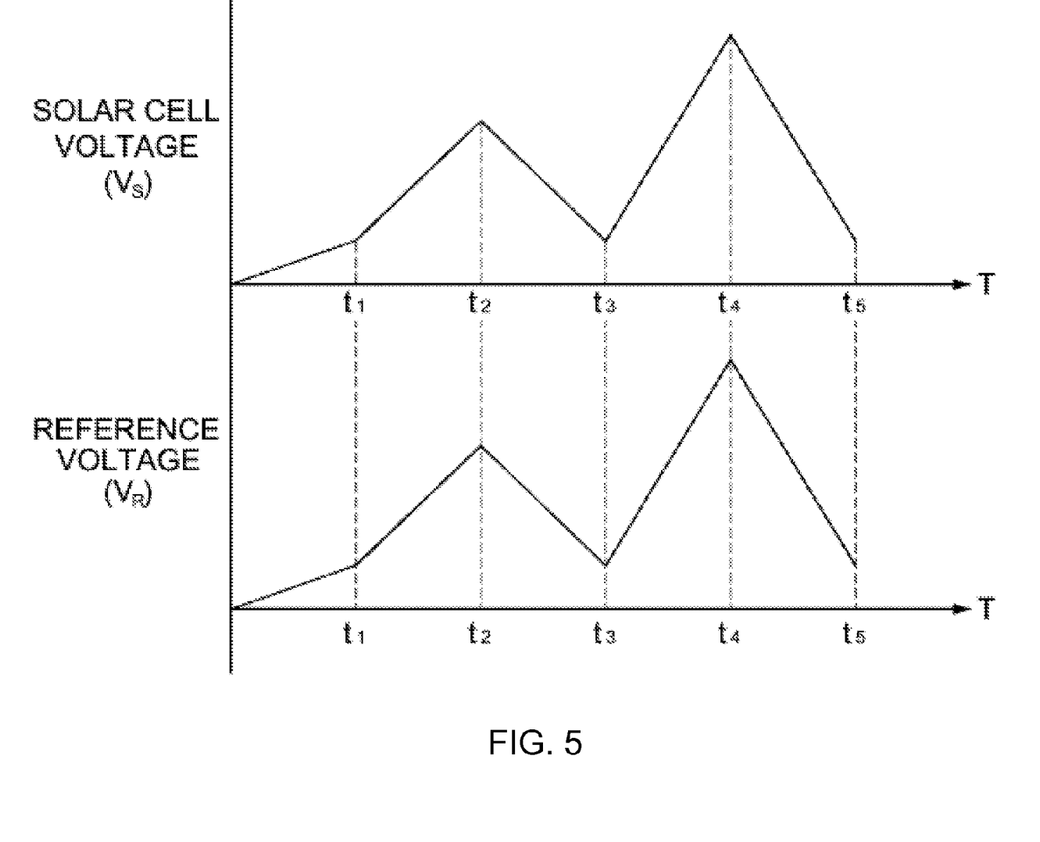
FIG. 5 is a diagram showing a change of a voltage behavior characteristic of a solar cell and a change of a reference voltage generated corresponding thereto.

In other words, if the sensed solar cell voltage (Vs) changes as shown in FIG. 5, the main control unit 180 controls so that the reference voltage (Vr) generated by the voltage generating unit 140 varies to a magnitude corresponding to the behavior characteristic of the solar cell voltage, and accordingly a magnitude of the charging current changes.

In an actual behavior characteristic curve of a reference voltage, a delay may occur in comparison to a solar cell voltage due to a sampling time interval, an element characteristic or the like. However, the drawing of FIG. 5 is depicted without a delay for convenience, and a scale of voltage magnitude is also depicted in a similar pattern for clear comparison.

The reference voltage may be precisely adjusted at each step based on 1024 regions (in case of 10 bits) by using a microcomputer, a D/A logic or the like. For example, if the voltage generating unit 140 is capable of generating a reference voltage of 0 to 2V, a unit step variation, namely an increment or decrement of the reference voltage, will be 2/1,024 V, and the reference voltage is increased or decreased by 2/1,024 in comparison to the present solar cell voltage accordingly.

The unit step variation may be set variously depending on a circuit designer, a product specification, a policy or the like after synthetically putting a circuit design, an operation response rate or the like into consideration. However, for better embodiment, the main control unit 180 of the present disclosure may calculate a hourly change rate of a solar cell voltage by using a present solar cell voltage, a previous solar cell voltage and a sensing time interval of the solar cell voltage, and variously adjust a hourly change amount for increasing or decreasing the reference voltage according to the calculated hourly change rate.

In other words, in a case where a voltage of a solar cell rapidly increases or decreases, rather than increasing or decreasing a voltage by means of the unit step variation having a fixed magnitude, it is possible to increase or decrease the reference voltage according to the increasing or decreasing ratio so that the charging operation may be maintained to be optimized for a present state.

Hereinafter, another embodiment of the present disclosure will be described with reference to FIG. 6.

Figure 6:
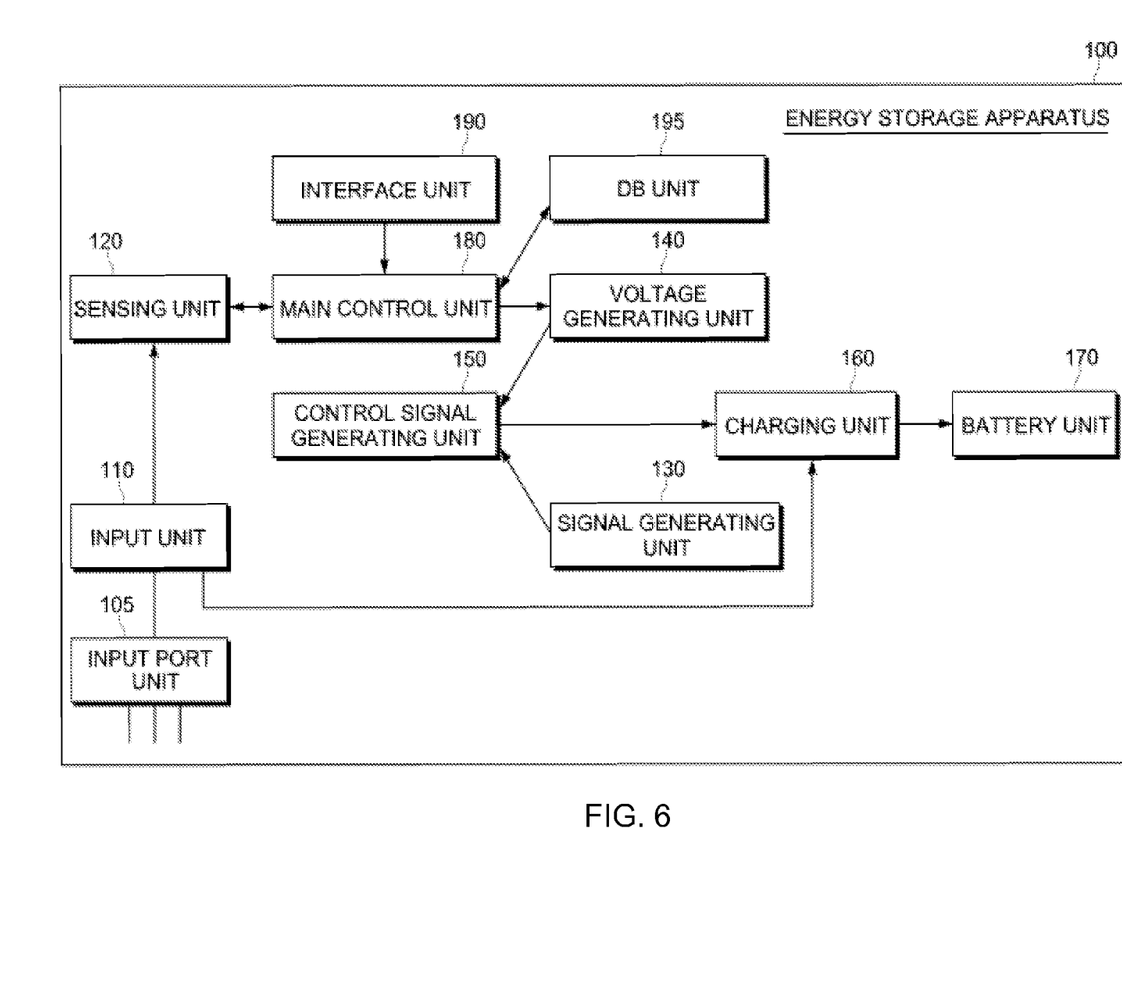
FIG. 6 is a block diagram showing an energy storage apparatus according to another embodiment of the present disclosure.

As shown in FIG. 6, the energy storage apparatus 100 of the present disclosure may further include an interface unit 190 and a DB unit 195.

The energy storage apparatus 100 of the present disclosure may be configured to be charged not only in a case where the solar cell described above is utilized as a power source but also in a case where a device for supplying a DC power by using a generator provided in a vehicle or a motorcycle is utilized as a power source.

In addition, the energy storage apparatus 100 of the present disclosure may also be configured to be charged using a general adaptor device which converts a commercial power into DC. For this, the present disclosure includes an input port unit 105 having a plurality of connection ports physically connected to a power terminal or an adaptor device of a vehicle so that a DC power may be supplied from an external power source, for example a DC power supply device provided in a vehicle or an adaptor device for supplying a DC power from a commercial power source, to the input unit 110.

In addition, if the energy storage apparatus 100 of the present disclosure is implemented as a physical device, a variable adjustment unit (e.g., a rotary switch, a digital switch, a touch panel or the like) may be provided to an exterior of the physical device so that a user may variously set a charging current through the variable adjustment unit.

If the set charging current, which is a charging current desired by the user, is selected through the variable adjustment unit, the set charging current is input to the interface unit 190 of the present disclosure.

Meanwhile, the DB unit 195 of the present disclosure stores data in which charging currents and corresponding reference voltages are functionally associated with each other.

If the set charging current set by the user is input through the interface unit 190, the main control unit 180 of the present disclosure reads a corresponding reference voltage from the DB unit 195, and controls the voltage generating unit 140 so that a constant reference value corresponding to the read reference voltage is generated by the voltage generating unit 140.

Since the change of the reference voltage changes the duty control signal and a magnitude of a charging current varies according to this signal as described above, the battery unit 170 of the present disclosure is charged to a specific charging current designed by the user through the above configuration.

In another embodiment, the sensing unit 120 of the present disclosure is configured to further sense and output an electric characteristic value (e.g., a voltage, a current, a power or the like) of an external power source when the external power source such as a vehicle power source or an adaptor device supplies power.

If the external power source is physically connected to the input port unit 105, a circuit loop connected to the battery unit 170 is temporarily intercepted, voltages at both ends of the external power source are sensed, and a current flowing through the circuit loop for sensing a current is sensed, thereby sensing an electric characteristic value such as a current of the external power source.

If a supplied power of a commercial external power source or an electric characteristic value is well known by the user, the variable adjustment unit may suitably change a charging current so that the battery unit 170 is charged with the changed charging current. However, if the user is not aware of a supplied power of the external power source, the charging current may be automatically optimized into a chargeable range by organically considering available external power sources, a magnitude of the electric characteristic value, a charging capacity specification of the battery unit 170 loaded therein or the like, in order to enhance user convenience, prevent damage of the apparatus and improve the charging efficiency.

For this, the main control unit 180 of the present disclosure calculates a max charging current, which is a present chargeable maximum current, by using an electric characteristic value of the external power source output from the sensing unit 120 and a chargeable maximum current of the battery unit 170 loaded therein.

The chargeable maximum current of the battery unit 170 may be obtained by utilizing specification information about a charging capacity, a power, an inherent voltage, a chargeable maximum current or the like of the battery unit 170, stored in the DB unit 195.

For example, assuming that the battery unit 170 has an available power of 100 W, an inherent voltage of 20V and a maximum charging current of 5 A and the electric characteristic value of the external power source input by the sensing unit 120 has a voltage of 25V, a current of 2 A and a power of 50 W, if the battery unit 170 performs a charging operation with 5 A which is the maximum charging current, the charging process is not performed since this current is much greater than an available current of the external power source. In addition, the external power source or electronic elements of the energy storage apparatus 100 according to the present disclosure may be damaged.

In this case, the main control unit 180 of the present disclosure calculates a max charging current (2 A), which is a present chargeable maximum current, by using the electric characteristic value of the external power source and the chargeable maximum current of the battery unit.

If the set charging current input by the user is greater than the max charging current (2 A), any problem may occur in the charging operation and in internal elements. Therefore, in this case, alarm information using a visual, auditory or tactile means (by using a display, blinking a lamp, outputting a sound, vibrating or the like) is output so that the user may recognize the problem.

Meanwhile, even though the user does not set a charging current, it is desirable to automatically charge with the max charging current, which is a chargeable maximum current, in order to shorten a charging time. Therefore, the main control unit 180 of the present disclosure may extract a reference voltage corresponding to the calculated max charging current from the DB unit 195 and control the voltage generating unit 140 to output a constant reference voltage corresponding to the reference voltage so that the battery unit 170 is charged with the max charging current.

Through the above configuration, an electric characteristic value of an external power source connected to the input unit 110 may be sensed and utilized to implement an optimal charging environment even though there is no artificial manipulation or operation of a user, thereby implementing a user-oriented convenient apparatus.

When a suitable converter or inverter module is provided as an extended module connected to the battery unit 170 to use a charging energy, it is desirable to use a power or AC/DC of a suitable magnitude, suitable for service environment and characteristics of an electric or electronic product.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

| Reference Symbols | |
|---|---|
| 100: energy storage apparatus of the present disclosure | |
| 110: input unit | 120: sensing unit |
| 130: signal generating unit | 140: voltage generating unit |
| 150: control signal generating unit | 160: charging unit |
| 170: battery unit | 180: main control unit |
| 190: interface unit | 195: DB unit |

What is claimed is:

1. An energy storage apparatus, comprising:
an input unit configured to receive a DC power from a solar cell;
a sensing unit configured to sense and output a voltage level of the solar cell;
a signal generating unit configured to generate a periodic signal whose magnitude is periodically changed;
a voltage generating unit configured to generate a reference voltage corresponding to the periodic signal;
a control signal generating unit configured to generate a duty control signal by using time intervals in which the periodic signal has a magnitude lower than or higher than the reference voltage;
a charging unit configured to perform a charging operation by means of an on/off switching operation in response to the duty control signal;
a battery unit configured to charge an energy by means of the charging operation of the charging unit; and
a main control unit for causing the voltage generating unit to adjust the reference voltage to a lower level when a current solar cell voltage is lower than a previous solar cell voltage and to adjust the reference voltage to a higher level when the current solar cell voltage is higher than the previous solar cell voltage.

2. The energy storage apparatus according to claim 1,
wherein the main control unit is configured to calculate an hourly change rate of a solar cell voltage by using the current solar cell voltage, the previous solar cell voltage and a sensing time interval of the solar cell voltage, and adjusts the reference voltage according to the hourly change rate.

3. The energy storage apparatus according to claim 1,
wherein the input unit is configured to receive a DC power from an external power source,
wherein the energy storage apparatus further comprises:
an interface unit configured to receive a set charging current from a variable adjustment unit; and
a DB unit configured to store data in which charging currents and reference voltages corresponding to the charging currents are associated with each other, and
wherein when the set charging current is input, the main control unit determines a reference voltage corresponding to the input set charging current using the DB unit and controls the voltage generating unit to output a constant reference voltage corresponding to the reference voltage determined by the main control unit so that a battery unit is charged with the set charging current.

4. The energy storage apparatus according to claim 3,
wherein when a DC power is supplied from the external power source, the sensing unit senses and outputs an electric characteristic value of the external power source, and
wherein the main control unit calculates a maximum charging current, which is a maximum chargeable current level at present, by using the electric characteristic value and a chargeable maximum current of the battery unit, outputs alarm information when the set charging current is greater than the maximum charging current, and controls to perform the charging operation only when the set charging current is less than the maximum charging current.

5. The energy storage apparatus according to claim 4,
wherein the main control unit calculates a reference voltage corresponding to the maximum charging current using the DB unit, and controls the voltage generating unit to output a constant reference voltage corresponding to the reference voltage calculated by the main control unit so that the battery unit is charged with the maximum charging current.

6. The energy storage apparatus according to claim 1, wherein the main control unit causes the charging operation to be started with the reference voltage being 0V.

7. The energy storage apparatus according to claim 3, wherein external power source is a DC power supply device provided at a vehicle or an adaptor device for supplying a DC power from a commercial power source.

* * * * *